US005107678A

United States Patent [19]

Jornod et al.

[11] Patent Number: 5,107,678

[45] Date of Patent: Apr. 28, 1992

[54] FLOATING FLUID-OPERATED ACTUATOR

[75] Inventors: Eugene R. Jornod, Caledonia; Lary L. Field, Argyle; Gerald R. Parsons, Loves Park, all of Ill.

[73] Assignee: Barber-Colman Company, Rockford, Ill.

[21] Appl. No.: 702,640

[22] Filed: May 17, 1991

[51] Int. Cl.[5] ................ F16D 31/02

[52] U.S. Cl. ................ 60/474; 91/459; 251/129.14; 251/129.1

[58] Field of Search ................ 60/474; 91/440, 459; 92/181 P, 183; 137/522, 901; 251/129.1, 129.14

[56] References Cited

U.S. PATENT DOCUMENTS

| | | | |
|---|---|---|---|
| Re. 16,140 | 8/1925 | Erickson | 251/129.1 |
| 1,834,506 | 12/1931 | Stukenborg | 60/474 |
| 2,981,199 | 4/1961 | Weissmann et al. | 60/474 |
| 3,036,598 | 5/1962 | Smith et al. | 91/459 |
| 4,982,902 | 1/1991 | Knapp et al. | 251/129.1 |

*Primary Examiner*—Edward K. Look
*Assistant Examiner*—F. Daniel Lopez
*Attorney, Agent, or Firm*—Leydig, Voit & Mayer

[57] ABSTRACT

The piston of a reciprocating hydraulic actuator carries a pump which is driven by an electric motor and which supplies oil from the low pressure chamber of a cylinder to the high pressure chamber thereof in order to advance the piston. An exhaust valve in the piston is normally held in a closed position by magnetic force created by energizing a coil and, when closed, enables pressurization of the high pressure chamber of the cylinder. When a second coil is energized, the magnetic field of the first coil is negated and the valve is opened by a spring to permit oil to exhaust from the high pressure chamber to the low pressure chamber and permit a second spring to retract the piston. If both the pump motor and the second coil are de-energized, the first coil keeps the valve closed and causes the piston to remain in a commanded position. The actuator may be controlled by a floating single pole, double throw switch and its piston is automatically shifted to its fully retracted position by the second spring if electrical power to the actuator is lost.

6 Claims, 2 Drawing Sheets

FLOATING FLUID-OPERATED ACTUATOR

BACKGROUND OF THE INVENTION

This invention relates generally to a fluid-operated actuator and, more particularly, to a reciprocating hydraulically-operated actuator for shifting a utilization device. The utilization device may, for example, be an HVAC damper which is shifted in opposite directions by the actuator and under the control of a thermostat.

A typical actuator which has been used in this environment comprises a cylinder, a piston supported to move back and forth in the cylinder, and a rod attached to the piston and extending from the cylinder for connection to the utilization device. When pressure fluid such as hydraulic oil is admitted into a high pressure chamber of the cylinder, the rod is advanced to shift the utilization device in one direction. If the pressure in the chamber then is kept constant, the rod is held in a stable commanded position. When pressure in the chamber is relieved, a spring retracts the rod to effect shifting of the utilization device in the opposite direction.

The assignee of the present invention previously has sold actuators of the foregoing type and, in such an actuator, the piston carries a motor-driven pump. When the motor is energized, the pump delivers oil from a sump chamber of the cylinder through a passage in the piston, and into the high pressure chamber of the cylinder in order to advance the piston and the rod. In a proportional actuator of this type, the flow of oil to the pressure chamber is modulated in order to drive the piston to and hold the piston in a commanded position. Such an actuator requires rather complex control circuitry and particularly where there is a need for the actuator to retract automatically and completely upon loss of electrical power to the system.

SUMMARY OF THE INVENTION

The general aim of the present invention is to provide a new and improved fluid-operated actuator os the above general type and capable, when power is applied to the system, of selectively advancing, retracting or holding in position and capable of fully retracting upon power failure; the actuator lending itself to being controlled by extremely simple circuitry.

A more detailed object of the invention is to achieve the foregoing through the provision of an actuator whose piston carries an electrically actuated control valve for selectively holding pressure fluid in or permitting pressure fluid to exhaust from the high pressure chamber of the cylinder in order to control the position of the piston.

A further object of the invention is to provide a transducer having two magnetic coils for effecting shifting of the control valve. One of the coils is constantly energized as long as power is applied to the system and normally holds the control valve in a closed position. When the other coil is energized, it negates the magnetic field of the first coil and enables the control valve to be shifted to an open position. Through use of the two coils, only a floating single pole, double throw switch is required to command the actuator to extend, hold or retract when the system is under power and, if power to the system is lost, the actuator is automatically returned to its fully retracted position.

The invention also resides in the provision of a unique leaf spring operable to apply to the control valve a closing force which is substantially independent of the magnetic force used to shift the control valve to its closed position.

These and other objects and advantages of the invention will become more apparent from the following detailed description when taken in conjunction with the accompanying drawings.

DETAILED DESCRIPTION OF THE PREFERRED EMBODIMENT

Figure 1:
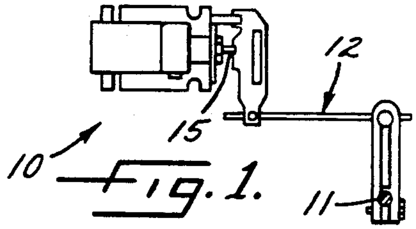
FIG. 1 is a diagrammatic illustration showing a typical application of a new and improved fluid-operated actuator incorporating the unique features of the present invention.

For purposes of illustration, the fluid-operated actuator 10 of the present invention has been shown in the drawings as forming part of a heating, ventilating and air conditioning system (HVAC). Specifically, the actuator is used to control the position of an airflow damper (not visible) supported to turn with a damper shaft 11. The shaft is connected by a linkage 12 to a reciprocating rod 13 which forms part of the actuator 10. When the rod is advanced or extended from left-to-right in FIG. 1, the damper shaft is rotated clockwise to close the damper. Retraction of the rod turns the damper shaft in the opposite direction to open the damper.

The actuator 10 includes a cylinder 14 which is divided into two chambers 15 and 16 by a piston 17 slidably sealed within the cylinder by a gasket 18. The rod 13 is connected to the piston and extends slidably through one end of the cylinder. An expandable bellows 20 is connected to the rod and seals off the lower end of the chamber 15.

In the present instance, the actuator 10 is a self-contained hydraulic actuator. Hydraulic oil is contained in the lower chamber 15 and is adapted to be pumped into the upper chamber 16 to advance the piston 17 and the rod 13. When the pressure in the upper chamber is relieved, the piston and the rod are retracted by a coil spring 21 telescoped over the rod within the cylinder 15 and compressed between the bellows 20 and the lower end of the cylinder.

To deliver oil from the lower chamber 15 to the upper chamber 16, the piston 17 carries a small gear pump 23 disposed in the lower chamber and adapted to be driven by an electric motor 25. When the motor is energized, oil from the chamber 15 is sucked into the inlet 26 of the pump, is pressurized, and is supplied to the upper chamber 16 by way of a passage 28 in the piston. A pressure relief valve 29 pops to terminate the supply of oil to the upper chamber and to return the oil from the pump directly to the lower chamber if the pressure in the upper chamber reaches a predetermined maximum value.

Figure 2:
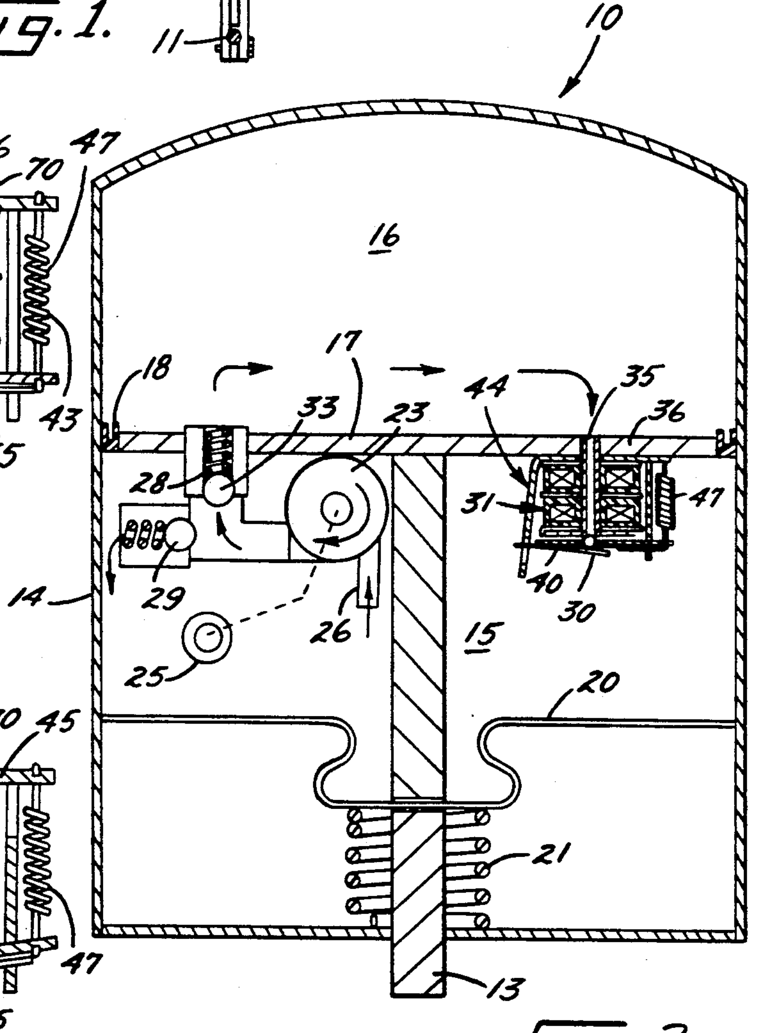
FIG. 2 is a cross-sectional view taken axially through the actuator and schematically showing certain components of the actuator.

In accordance with the present invention, an on-off control valve 30 (FIGS. 2 to 4) is incorporated in the piston 17 and is adapted to be moved between closed and open positions by a novel transducer 31. Normally, the transducer holds the valve in a closed position (FIG. 3) and, when the valve is closed and the pump 23 is operating, oil delivered upwardly through the passage 28 pressurizes the chamber 16 and causes the piston 17 and rod 13 to advance downwardly. When the pump is stopped and the valve 30 is held in its closed position, a check valve 33 (FIG. 2) in the passage 28 prevents oil from flowing out of the upper chamber 16 through the passage 28. Thus, the upper chamber remains pressurized and the piston remains in any position to which it has been advanced. When the valve 30 is opened, oil is exhausted from the upper chamber 16 to the lower chamber 15 and, as an incident thereto, the spring 21 acts to retract the rod 13 and the piston 17 upwardly. As will become apparent subsequently, loss of electrical power to the actuator 10 results in the piston and the rod being fully retracted and, in this particular instance, results in the airflow damper being moved to and held in its fully open position.

More specifically, the valve 30 is in the form of a small spherical ball which is adapted to move between closed and open positions with respect to a passage 35 extending through the piston 17 and defined by the interior of a soft iron tube 36 which is carried by the piston. The lower end of the tube defines an outlet port 37 against which the ball 30 seats when the ball is in its closed position.

Herein, the transducer 31 is in the form of a solenoid having an armature 40 which is formed with a hole 41 for loosely receiving the ball 30. One end portion of the armature is supported by one leg 43 of a generally U-shaped support or bracket 44 in such a manner as to permit the armature to pivot upwardly and downwardly, the bracket being formed with a crosspiece 45 which is attached to the lower side of the piston 17. A tension spring 47 is connected between the crosspiece and the end portion of the armature and urges the armature to pivot counterclockwise. Thus, the main body of the armature is biased downwardly away from the tube 36.

Means are provided for selectively creating a magnetic field for attracting the armature 40 toward the tube 36. Herein, these means comprise an electrical coil 50 telescoped over the tube and operable when energized to produce magnetic flux in a pole piece 51 located beneath the coil, secured to the tube and disposed in opposing relation with the armature. The flux cuts across an air gap between the armature and the pole piece and attracts the armature upwardly toward the pole piece and the tube in order to move the ball 30 to its closed position against the outlet port 37 at the lower end of the tube.

Advantageously, a leaf spring 55 is secured to the lower side of the armature 40 and, when the armature is pulled upwardly, presses the ball 30 against the lower end 37 of the tube 36 with a force which is substantially independent of the magnetic pull-in force applied to the armature. Herein, the spring includes a flat, thin and generally rectangular strip 56 (FIG. 5) of beryllium copper having one end portion which is riveted to the armature at 57. The other end portion of the strip 56 is formed with a tab 58 which extends through a hole 59 in a leg 60 of the bracket 44, the tab 58 being engageable with the lower edge of the hole to limit counterclockwise pivoting of the armature 40 under the influence of the spring 47.

Figure 3:
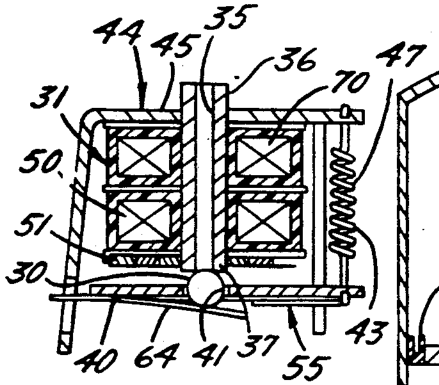
FIG. 3 is an enlarged view of the transducer illustrated in FIG. 2 and shows the control valve in its closed position.
Figure 5:
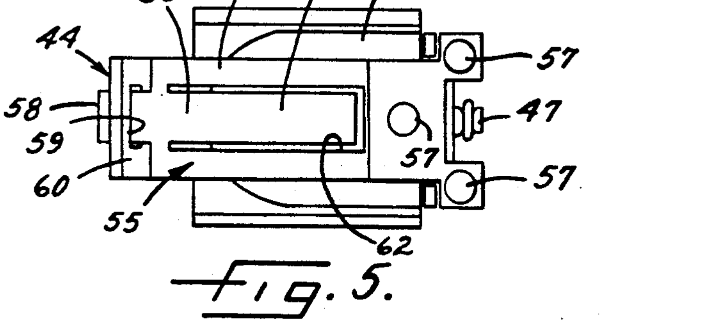
FIG. 5 is an enlarged bottom plan view of a portion of the transducer.

As shown in FIG. 5, a generally U-shaped opening or slot 62 is formed through the strip 56 of the spring 55 between the ends thereof. By virtue of the slot 62, the spring 55 is left with a tongue 64 which is cantilevered to the strip 56 at 65 and which closes off the lower side of the hole 41 in the armature 40. When the spring 55 is relaxed, the tongue 64 is disposed in substantially the same plane as the strip 56. When the armature 40 pulls the ball 30 into engagement with the lower end of the tube 36, the ball loads the tongue 64 and deflects the latter downwardly out of the plane of the strip as shown in FIG. 3. Accordingly, the force which holds the ball in its closed position is determined primarily by the low spring rate of the tongue 64 rather than by the magnetic force with which the armature 40 is attracted to the pole piece 51. If excessively high pressures develop in the upper chamber 16 when the ball is closed, the tongue 64 yields to allow the ball to crack open and bleed off the pressure.

In carrying out the invention, the transducer 31 includes a second electrical coil 70 which, when energized, negates or cancels the magnetic field produced by the coil 50 so that the spring 47 may swing the armature 40 counterclockwise and effect opening of the ball 30. Herein, the coil 70 is located above and is insulated from the coil 50 and surrounds the upper portion of the tube 36. The coil 70 is phased oppositely of the coil 50 and thus, when both coils are energized, the magnetic field produced by the coil 70 cancels the field of opposite phase produced by the coil 50. As a result, there is no effective magnetic force to attract the armature 40 toward the pole piece 51 and hence the spring 47 acts to swing the armature counterclockwise to the position of FIG. 4 and effect opening of the ball 30.

Figure 4:
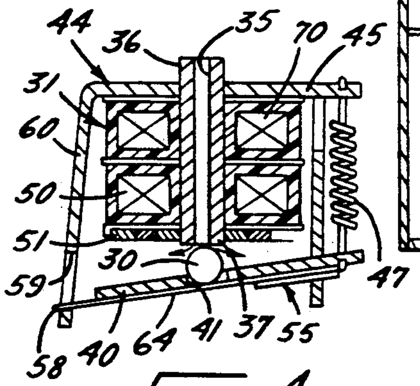
FIG. 4 is a view similar to FIG. 3 but shows the control valve in its open position.

To summarize operation of the actuator 10 as described thus far, the coil 50 normally is energized, the coil 70 normally is de-energized and thus the ball 30 normally is held in its closed position shown in FIG. 4 and prevents oil from exhausting from the upper chamber 16 to the lower chamber 15 by way of the passage 35 in the tube 36. When the motor 25 is energized, the pump 23 delivers oil from the lower chamber 15 to the upper chamber 16 via the passage 28 and, by virtue of the ball 30 closing the passage 35, oil in the upper chamber is pressurized to advance the piston 17 and the rod 13.

The piston 17 and the rod 13 continue to advance until the motor 25 is de-energized. The coil 50 remains energized and, if the coil 70 remains de-energized, the piston and rod stop in the commanded position. If the motor is again energized, the piston and rod extend to a more advanced position. If, however, the coil 70 is energized, the valve 30 opens to allow oil to exhaust from the chamber 16 to the chamber 15 via the passage 35. The spring 21 thus acts to retract the piston and the rod and will shift these components to their fully retracted position unless, during the retraction, the coil 70 is de-energized. Under such circumstances, the valve 30 recloses and holds the piston and rod in an intermediate retracted position.

In the event power to the actuator 10 is lost, the coil 50 is de-energized and the spring 47 effects opening of the ball 30. All pressurized oil in the upper chamber 16 is relieved to the lower chamber 15 via the passage 35 and thus the spring 21 fully retracts the piston 17 and rod 13. In this way, the damper is shifted to a fully open (heat) position upon power failure.

Figure 6:
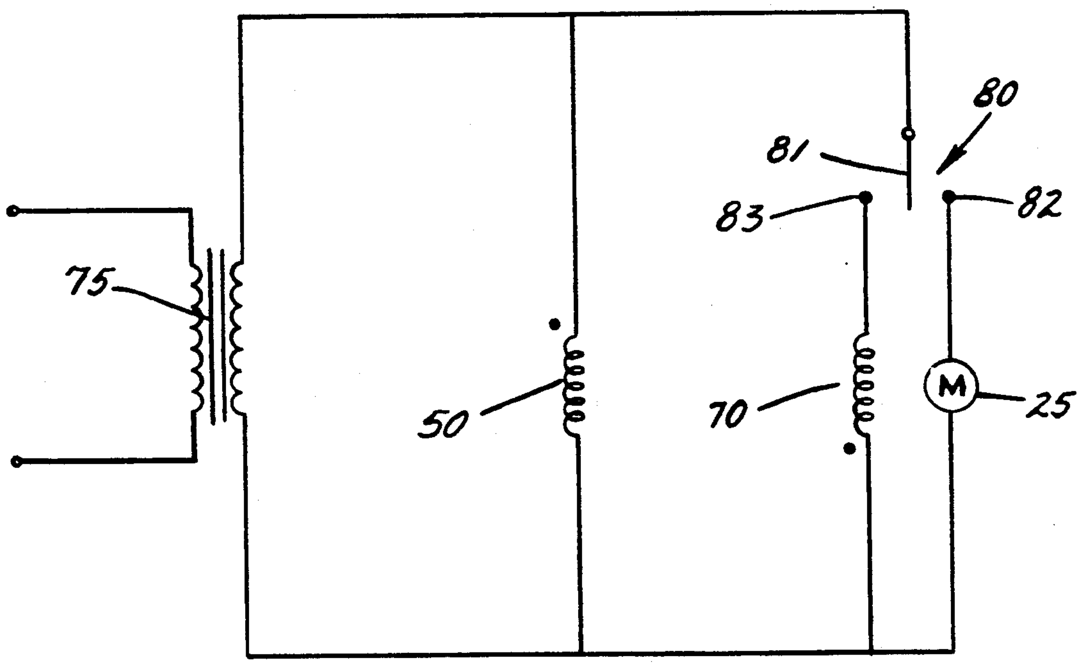
FIG. 6 is a diagram of an electrical circuit for controlling the actuator.

FIG. 6 is a circuit diagram and shows extremely simple circuitry for controlling operation of the actuator 10. The actuator may be powered by a.c. voltage (e.g., 24 volts a.c. from the secondary of a transformer 75) and, as shown, the coil 50 is connected directly across the secondary and thus is energized at all times when power is available to the transformer.

Connected in parallel with the coil 50 is a floating single pole, double throw switch 80 having a blade 81 (e.g., a bimetallic blade) adapted to float from a neutral position shown in FIG. 6 and to close either a contact 82 or a contact 83. The motor 25 is energized upon closure of the contact 82 while the coil 70 is energized upon closure of the contact 83.

FIG. 6 shows the circuit when the actuator 10 is in its "hold" mode. Both the motor 25 and the coil 70 are de-energized but the coil 50 is energized to keep the valve 30 closed and maintain a constant pressure in the upper chamber 15. If the blade 81 of the switch 80 closes the contact 82, the motor 25 is energized to drive the pump 23 and cause the piston 17 and the rod 13 to advance until such time as the contact 82 is opened. When the blade 81 closes the contact 83, the coil 70 is energized and its magnetic field negates that of the coil 50 so as to permit the spring 47 to open the valve 30 and permit the spring 21 to retract the piston 17 and the rod 13 until the contact 83 is again opened. Upon power failure, the coil 50 is de-energized and the piston and rod are fully retracted in the manner explained above.

From the foregoing, it will be apparent that the present invention brings to the art a new and improved actuator 10 which is controlled by an on-off exhaust valve 30 and without need of modulating the flow of oil into the high pressure chamber 16. The use of the two coils 50 and 70 for effecting shifting of the valve enables the use of extremely simple circuitry for controlling the actuator. Those familiar with the art will appreciate that an electronic switching device (e.g., a triac) could be used in place of the mechanical switch 80 which has been specifically disclosed.

We claim:

1. A fluid-operated actuator comprising a cylinder, a piston disposed in said cylinder and coacting with said cylinder to define a chamber, a rod connected to said piston and extending from said cylinder, a source of pressure fluid adapted to communicate with said chamber, said piston being moved in one direction when pressure fluid is admitted into said chamber and being moved in the opposite direction when pressure fluid is exhausted from said chamber, and means selectively operable to hold pressure fluid in said chamber or to enable pressure fluid to exhaust from said chamber, said means comprising a passage extending through said piston and communicating with said chamber, a valve member carried by said piston and movable relative to said passage between a closed position holding pressure fluid in said chamber and an open position enabling pressure fluid to exhaust from said chamber through said passage, and means for moving said valve member between said closed and open positions, said moving means comprising a transducer having an armature associated with said valve member and having first and second electrical coils, said first coil being operable when energized to create a magnetic field shifting said armature in a first direction causing said valve member to move to said closed position, said second coil being operable when energized to create a magnetic field negating the magnetic field of said first coil, and spring means for shifting said armature in a second and opposite direction enabling said valve member to move to said open position when the magnetic field of said first coil is negated.

2. A fluid-operated actuator as defined in claim 1 further including a spring for shifting said piston when the magnetic field of said first coil is negated and pressure fluid is exhausted from said chamber.

3. A hydraulically-operated actuator comprising a cylinder, a piston disposed in said cylinder and dividing said cylinder into first and second chambers, a rod connected to said piston and extending from said cylinder, said first chamber containing hydraulic oil, a first passage extending through said piston and communicating with said chambers, a pump carried by said piston, an electric motor connected to said pump and operable when energized to drive said pump and cause said pump to deliver oil from said first chamber, through said first passage, and into said second chamber, said piston being moved in one direction when oil is delivered into said second chamber, resilient means for moving said piston in the opposite direction when oil is exhausted from said second chamber into said first chamber, means preventing oil from exhausting from said second chamber to said first chamber through said first passage, a second passage extending through said piston and between said chambers and having an outlet port disposed in said first chamber, a valve member carried by said piston and movable relative to said outlet port between a closed position holding oil in said second chamber and an open position enabling oil to exhaust from said second chamber to said first chamber through said second passage, means for moving said valve member between said closed and open positions, said moving means comprising a transducer having a support connected to and carried by said piston, an armature pivotally mounted on said support to move toward and away from said outlet port, a leaf spring carried by said armature, said valve member comprising a ball disposed between said leaf spring and said outlet port, said ball being pressed against said outlet port and into said closed position by said leaf spring when said armature is pivoted toward said outlet port and loads said leaf spring, said ball moving away from said outlet port and to said open position when said armature is moved away from said outlet port and permits said leaf spring to relax, said transducer having first and second electrical coils, said first coil being operable when energized to create a magnetic field causing said armature to pivot toward said outlet port, said second coil being operable when energized to create a magnetic field negating the magnetic field of said first coil, and spring means connected between said armature and said support for pivoting said armature away from said outlet port when the magnetic field of said first coil is negated.

4. A hydraulically-operated actuator as defined in claim 3 in which said leaf spring comprises a strip of resiliently yieldable material secured to said armature, an opening formed through said strip, and a tongue formed integrally with said strip and extending into said opening, said tongue being cantilevered to said strip and being disposed in substantially the same plane as said strip when said leaf spring is relaxed, said tongue engaging said ball and flexing out of the plane of said strip when said armature is pivoted toward said outlet port and said leaf spring is loaded against said ball.

5. A hydraulically-operated actuator as defined in claim 3 further including an electrical source for supplying electrical power to said motor and said coils, said first coil being energized whenever power is being supplied by said source, and switching means selectively operable to effect energization of either said motor or said second coil.

6. A hydraulically-operated actuator as defined in claim 5 in said switching means comprises a floating single pole, double throw switch connected serially with said motor and said second coil.

* * * * *